United States Patent [19]
Sollami

[11] Patent Number: 4,941,554
[45] Date of Patent: Jul. 17, 1990

[54] HYDRAULIC TORQUE RESISTANCE DEVICE

[76] Inventor: Phillip A. Sollami, 1300 E. Pine, Herrin, Ill. 62948

[21] Appl. No.: 296,680

[22] Filed: Jan. 13, 1989

[51] Int. Cl.⁵ .............................. F01C 9/00; F16F 9/14
[52] U.S. Cl. ...................................... 188/310; 92/125; 188/314
[58] Field of Search .............. 188/306, 310, 307, 308, 188/309, 319, 314, 296, 278; 92/121, 125

[56] References Cited

U.S. PATENT DOCUMENTS

| | | | |
|---|---|---|---|
| 1,802,350 | 4/1931 | McIntyre | 188/310 |
| 1,873,100 | 8/1932 | Allen | 188/310 |
| 2,016,591 | 10/1935 | Chapin | 188/310 |
| 2,019,440 | 10/1935 | Watson | 188/306 |
| 2,419,651 | 4/1947 | Magrum | 188/306 |
| 2,853,159 | 9/1958 | Kuhn, Jr. | 188/314 |
| 2,902,009 | 9/1959 | Ludwig et al. | 92/125 X |
| 2,960,076 | 11/1960 | Henry | 92/125 |
| 3,021,822 | 2/1962 | Rumsey | 92/125 |
| 3,126,910 | 3/1964 | Reed | 188/310 |
| 3,128,679 | 4/1964 | Trendle | 92/125 |
| 3,207,048 | 9/1965 | Rumsey | 92/125 |
| 3,426,654 | 2/1969 | Laughman | 92/125 |
| 4,475,738 | 10/1984 | Eicher et al. | 92/122 |
| 4,495,856 | 1/1985 | Sollami | 92/125 |
| 4,656,925 | 4/1987 | Sollami | 92/125 |
| 4,774,875 | 10/1988 | Anshoff, III | 92/125 X |
| 4,823,678 | 4/1984 | Sollami | 92/125 |

*Primary Examiner*—Andres Kashnikow
*Assistant Examiner*—Matthew C. Graham
*Attorney, Agent, or Firm*—Edmond T. Patnaude

[57] ABSTRACT

A torque resistance device includes a rotor, a vane, and a valve device for regulating the resistance at which the rotor operates. The valve device is mounted to the housing for the rotor and vane assembly. The valve device includes a valve member which is adjustable via a threaded shaft.

8 Claims, 4 Drawing Sheets

HYDRAULIC TORQUE RESISTANCE DEVICE

The present invention relates in general to torque resistance devices, and it relates in particular to a device of the type which includes a pump which forces hydraulic fluid through an adjustable restriction in response to rotation of a shaft.

BACKGROUND OF THE INVENTION

Torque resistance devices which employ springs, friction or weights to resist rotation of a shaft are well known, having found many applications including use as brakes and as adjustable loads in exercise machines. Another type of torque resistor utilizes a hydraulic pump and an adjustable load. This latter type of torque resistor would be particularly suited for use in exercise machines where a constant torque resistance within a wide range of angular movement of a shaft is important.

SUMMARY OF THE INVENTION

Briefly, there is provided in accordance with the present invention a new and improved self-contained adjustable torque resistor which is well suited for use in an exercise machine such, for example, as the torso exerciser disclosed in my copending application Ser. No. 290,589 filed 12/27/88. In a preferred embodiment of this invention a self-contained adjustable torque resistor includes a rotor and vane assembly which is angularly moveable in a chamber filed with hydraulic fluid. The chamber is defined by a cylindrical bore in a tubular body, the ends of which are sealably closed by a pair of head members which contain the bearings in which the rotor is journaled. Two separate holes are drilled in one of the head members and these holes each open at one end into the chamber on opposite sides of a stator which extends radially into the chamber into sealing engagement with the rotor. These holes open at the other respective ends into an elongate recess in an external surface of the head member. The recess is sealably closed by a valve housing affixed to the head member. Angular movement of the rotor thus pumps hydraulic fluid from one side of the rotor to the other side of the rotor through the two holes and the interconnected elongate recess.

A valve member is threadedly mounted in a hole through the valve housing member for adjustable movement toward and away from the edge of one of the holes to provide an adjustable restriction to the flow of hydraulic fluid between said recess and said one of the holes. A spring loaded or air pressurized fluid reservoir to replace any fluid which may leak from the device is mounted to the valve housing member and is connected to the elongate recess by a second hole in the housing member. The fluid reservoir also provides a space into which the fluid may flow when it is heated and expands.

GENERAL DESCRIPTION OF THE DRAWINGS

Further objects and advantages and a better understanding of the present invention will be had by reference to the following detailed description taken in connection with the accompanying drawings wherein.

DETAILED DESCRIPTION OF A PREFERRED EMBODIMENT OF THE PRESENT INVENTION

Figure 1:
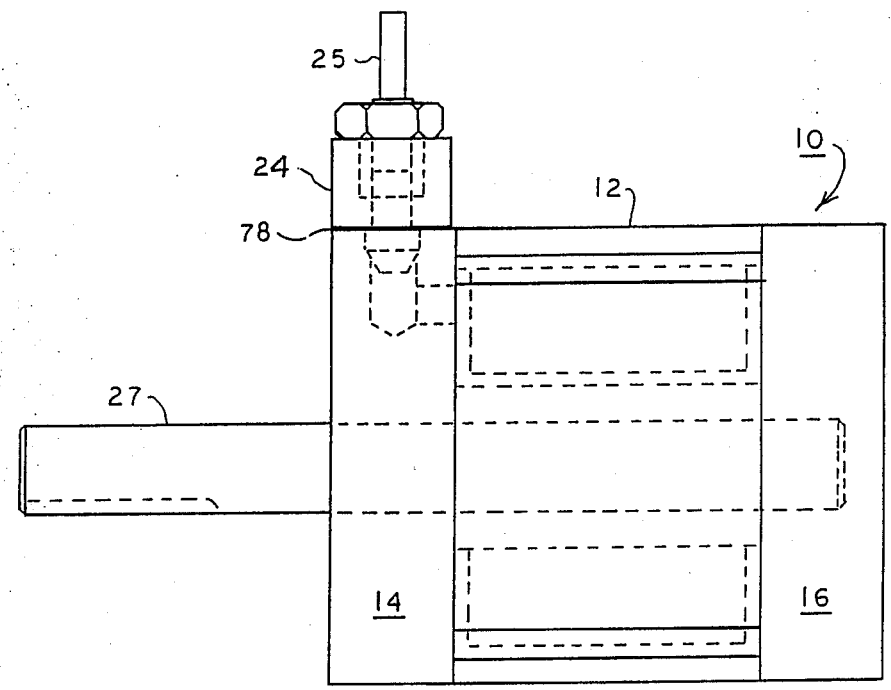
FIG. 1 is a side elevational view of an adjustable torque resistance device embodying the present invention.
Figure 2:
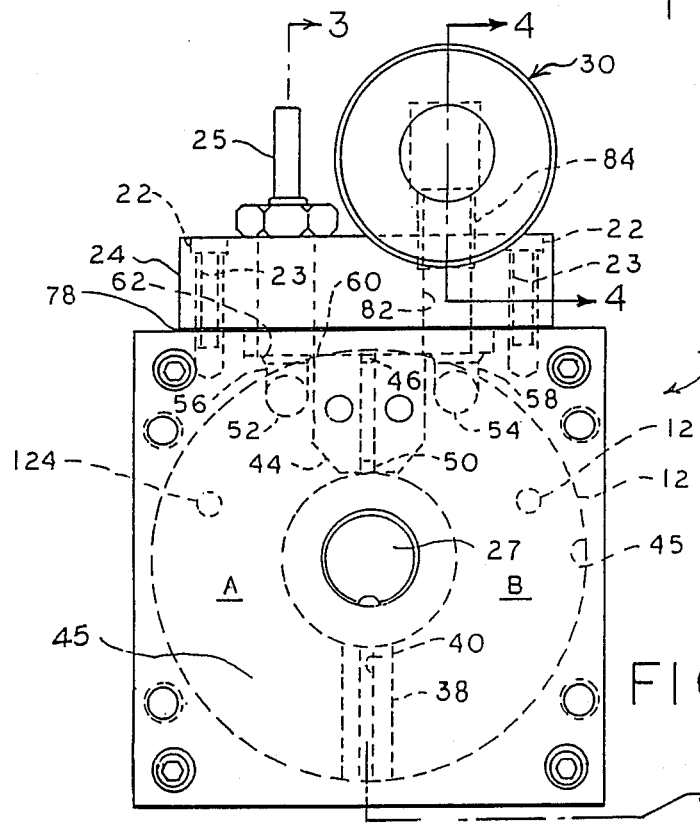
FIG. 2 is an elevational view taken from the left hand side of FIG. 1.

Referring particularly to FIGS. 1 and 2, an adjustable torque resistance device 10 comprises a tubular body member 12 over the opposite ends of which a pair of head members 14 and 16 are sealably affixed. As may be best seen in FIG. 2, the member 12 is circular in cross-section and the head members 14 and 16 are square in cross-section. A plurality of nut and bolt assemblies are used to secure the head members 14 and 16 together and to the ends of the body member 12.

Figure 3:
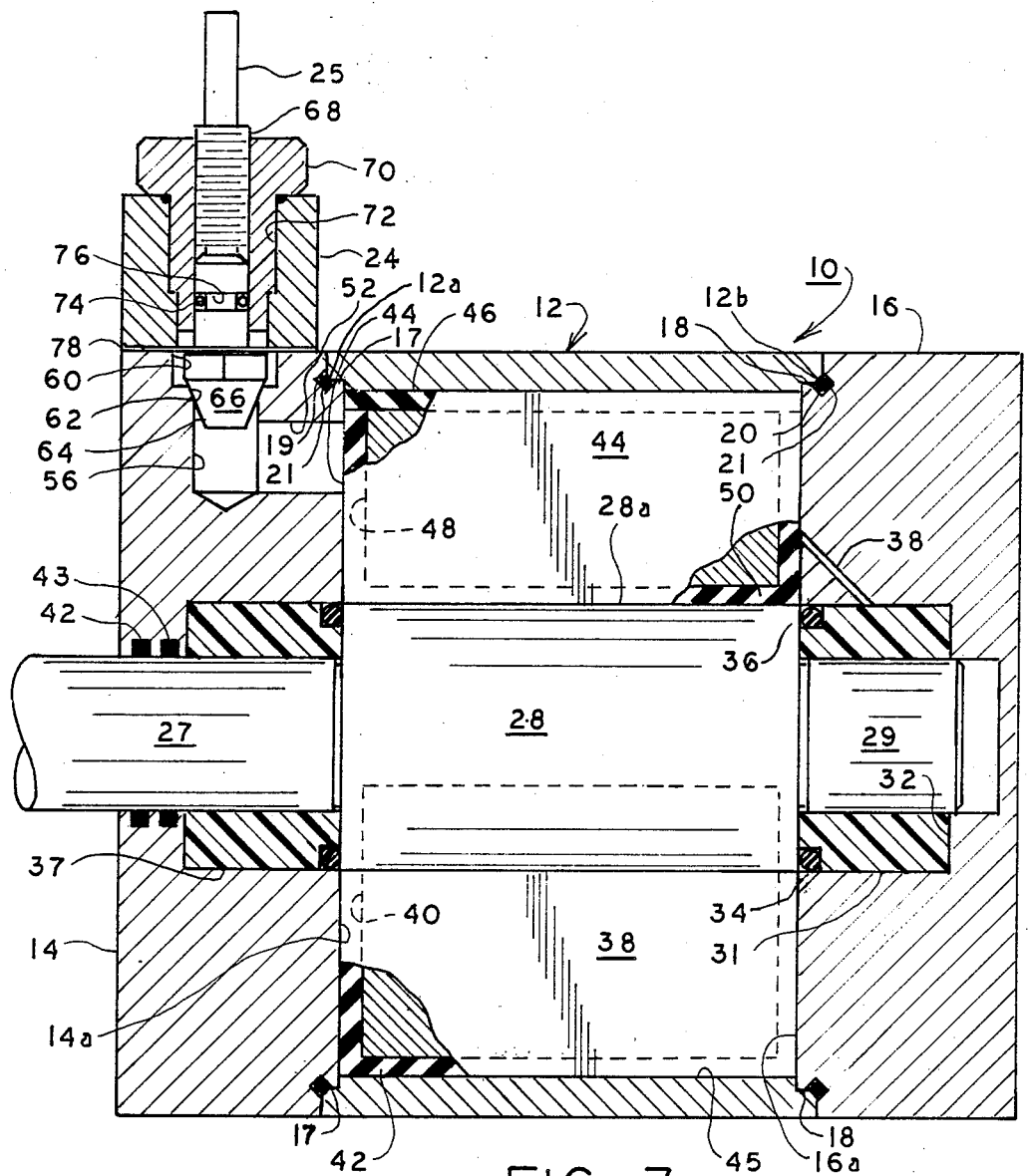
FIG. 3 is a cross-sectional view taken along the line 3—3 of FIG. 2.

In order to seal the ends of the body member 12 to the heads 14 and 16, the heads are respectively provided with annular grooves 17 and 18 which receive the ends of the body members 12 as best shown in FIG. 3. It will be seen that the inner edges 12a and 12b of the body member 12 are chamfered. A second pair of annular grooves 19 and 20 are respectively provided at the corners of the grooves 17 and 18. The grooves 19 and 20 are rectangular in cross-section and extend at an angle of forty-five degrees relative to the longitudinal axis of the body member 12, and a pair of elastomeric O-rings 21 are fitted into the grooves 19 and 20. This novel construction enables the use of several seal sizes for a wide range of pressures. Moreover, the construction permits expansion and contraction of the O-rings during use and permits the O-rings to adapt to contraction of the O-rings during use and permits the O-rings to adapt to dimensional tolerances in the heads and body member.

The maximum O.D. of the seal is restricted by the O.D. of the extension that protrudes into the end of the tube. When the O.D. of the seal is equal to the O.D. of the ⅛" protrusion, maximum pressure sealing results. However, when smaller O.D. seals are used, they must be stretched over the protruding diameter. This stretching consequently reduces the cross-section of the "O" ring thus allowing a greater range of seal sizes which are usable. In addition, the tube end is perfectly parallel in a metal to metal relationship whenever the tube and heads are assembled. This relationship eliminates the possibility of the seal squeezing or extruding out of the grooves 19 and 20.

Figure 4:
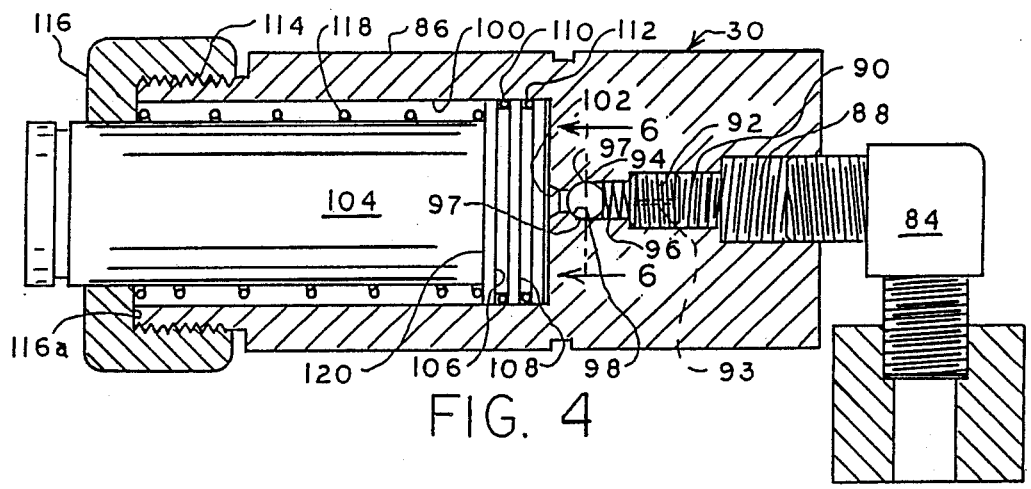
FIG. 4 is a cross-sectional view taken along the line 4—4 of FIG. 2 showing the pressurized reservoir of the present invention.
Figure 5:
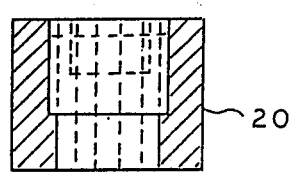
FIG. 5 is a cross-sectional view of the valve section of the device of FIG. 1 prior to assembly thereof.
Figure 5:
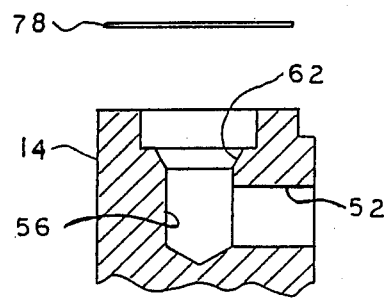

As shown, four screws 22 are set in counterbored holes 23 in a housing block 24 and are threaded into the tapped holes in the head member 14. A rotatable shaft 25 extends upwardly from the block 24, as described in greater detail hereinafter, and is used to adjust the torque required to rotate a shaft 27 forming part of the rotor of the device 10 and extending from the head member 14. A pressurized hydraulic fluid reservoir 30 which is described in greater detail hereinafter in connection FIG. 4 is also mounted to the block 24.

With particular reference to FIG. 3, it may be seen that the shaft 27, which extends from the head member 14, is an integral part of a rotor which includes a large diameter central section 28 and small diameter end sections 27 and 29. Rotor section 29 is journaled in a sleeve bearing 31 which is tightly fitted into a blind bore 32 in the head member 16. The head member 16 is provided with an annular groove 34 which is rectangular in cross-section and in which is mounted an annular sealing gasket 36. The shaft 27 is also journaled in a sleeve bearing 37 which is mounted in a complementary bore in the head member 14. A hole 38 extends through the head member 16 from the inner face thereof to the wall of the bore 32 to provide a pressure equalizing passage between the working chamber in the housing 12 and the rear end of the bearing 31. Alternative sleeve designs are also shown and described hereinafter in connection with FIGS. 7 and 8.

Fixedly mounted to the central rotor section 28 and extending radially therefrom is a vane 38. The rotor vane 38 is provided with a peripheral groove 40 in which is mounted a generally U-shaped resilient gasket 42. The gasket 42 is pressed against the cylindrical chamber wall in the tubular housing 12 and against the head members 14 and 16 to provide a seal between the inner cylindrical surface 45 of the tubular housing 12 and the faces 14a and 16a of the head members 14 and 16 respectfully. The construction of the rotor and vane assembly is described in greater detail in my co-pending application Ser. No. 283,505 filed 12/12/88.

Suitable resilient sealing rings 42 and 43 are compressed between the shaft section 27 and the head member to prevent hydraulic fluid from leaking from the main chamber to the ambient.

A stator 44 is fixedly secured to the heads 14 and 16 by a plurality of dowel pins, two on each end, see FIG. 2, and is sealed to the body members 12 by a resilient gasket 46. The stator 44 may be seen to extend radially into the chamber 45 towards the rotor and is provided with a peripheral groove 48 in which a generally U-shaped resilient sealing gasket 50 is disposed for sealably engaging the inner walls 14a and 16a of the head member 14 and 16 and the cylindrical surface 28a of the central rotor section 28.

As may best be seen in FIG. 2, the stator 44 thus separates the cylindrical bore 45 of the housing member 12 into a first compartment designated A located between one side of the stator 44 and one side of the rotor vane 38 and a second compartment designated B located between the other side of the stator 44 and the other side of the rotor vane 38.

A pair of holes 52 and 54 extend from the head member surface 14a on either side of the stator 44 in close proximity thereto and respectively connect with vertical holes 56 and 58 which open at the top into an elongate recess 60 provided in the top surface of the head member 14. As best shown in FIG. 3, an annular countersink is provided at the top edge of the hole 56 and provides a valve seat 62 against which the conical surface 64 of a valve member 66 is adapted to be seated. The vertical hole 58, as best shown in FIG. 2, also opens onto the elongate recess 60.

The resistance adjusting shaft 25 is an integral part of the valve member 66 and is provided with an intermediate threaded portion 68 which is threadedly received in a valve plug 70 which is in turn threadedly received in a hole 72 in the block 24. An O-ring 74 is compressed in an annular groove 76 in the valve member 66 to prevent leakage of fluid between the valve member and the plug 70. Fluid leakage between the head member and the block 24 is prevented by means of a sealing gasket 78 which is compressed between the bottom surface of the block 24 and the top surface of the head member 14. The block 24 is also provided with a drilled and tapped hole 82 which opens at the bottom onto the elongate recess 60 in the top surface of the head member 14. An elbow 84 to which the fluid reservoir 30 is connected is threaded into the top of the block 24.

The torque resistance device 10 is bidirectional, i.e., rotation of the shaft 27 in either a clockwise or a counterclockwise direction causes fluid to flow between the chambers A and B through the holes 52, 56 and 54, 58, the recess 60 and the annular space between the seat 62 and the conical surface 64 of the valve member 66. The latter annular space provides an adjustable restriction to the flow of fluid and thus enables adjustment of the torque required to rotate the shaft 27. The restriction is adjustable by rotation of the torque adjusting shaft 25 thereby screwing valve member 66 toward or away from the valve seat 62.

Referring now to FIG. 4, it will be seen that the fluid reservoir 30 comprises a housing block 86 which is elongate and provided with an axial bore having a multiplicity of counterbores. The elbow 84 is sealably and threadly secured to the block 30 in a counterbore 88 which opens onto an intermediate counterbore 90 which is threaded and receives a set screw 92. A narrow hole 93 extends through the screw 92 along the central longitudinal axis thereof to permit hydraulic fluid to pass therethrough. A spherical ball valve member 94 is biased by a coil spring 96 against an annular generally conically shaped valve seat 98 which has two fine grooves 97 therein to allow passage of hydraulic fluid when the fluid is heated and expands. The set screw 92 permits adjustment of the force exerted by the spring 96 on the ball 94.

Figure 6:
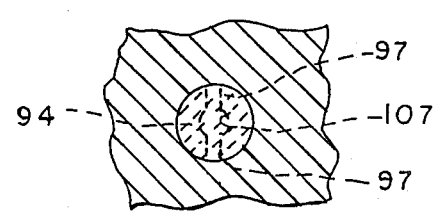
FIG. 6 is a cross-sectional view taken along the line 6—6 of FIG. 4.

The grooves 97, as may best be seen in FIG. 6, provide bypass passageways around the ball valve 94 which prevent an excessive pressure from building up in the working chamber when the rotor is rotated back and forth at a rapid rate and heats up the hydraulic fluid. The grooves 97 also permit any air which may be trapped in the system to float up into the reservoir in the counterbore 100.

The counterbore 100 provided at the end of the housing block 86 opens at its base onto a passage 102 which extends between the counterbore 100 and the valve seat 98, and a piston 104 is slidably mounted in the counterbore. The piston 104 is provided with a pair of external annular grooves 106 and 108 which respectively receive resilient annular sealing gaskets 110 and 112 to seal the piston to the wall of the counterbore 100. The block 30 is provided with an externally threaded outer end 114 over which a centrally apertured cap nut 116 is threaded. A coil spring 118 is compressed between the inner annular wall 116A of the nut 116 and an annular flange 120 on the piston 104.

In FIG. 4 the reservoir is shown in a substantially empty condition. In use the hydraulic fluid supply is located within the bore 100 between the bottom end of the piston 104 and the bottom surface of the bore 100. The end of the piston which extends outwardly from the cap 116 thus provides a visual indication of the amount of fluid remaining in the reservoir. The pressure on the rear o right-hand side of the ball 94 is the same as the pressure in the chambers A and B plus the force exerted by the spring 118. When the force exerted on the ball 94 by the pressure in the chamber plus the force of the spring 96 exceeds the force exerted on the piston 104 by the spring 118 the ball valve 94 remains seated against the valve seat 98. When, however, due to leakage of hydraulic fluid from the unit the pressure within chambers A and B falls to a level such that the force closing the ball valve 94 is less than the force exerted on the ball by the spring 118, the ball 94 moves away from the seat 98 to permit fluid to pass from the reservoir into the chambers A and B thereby to replace any fluid which had leaked from the unit. If desired, the spring 118 may be eliminated, and in that case a suitable valve extends through the cap 116 for pneumatically pressurizing the space in the counterbore 100. The piston 104 and the spring 118 are removed from the bore 100 when the unit is pneumatically pressurized.

It will thus be seen that the adjustable torque resistor 10 of the present invention is a self contained unit which is particularly adapted for use in exercising machines wherein the person doing the exercising rotates the shaft 27 against a constant angular resistance throughout the full range of angular movement of the rotor 28. If desired, stop members such as dowel pins may be positioned in the chambers A and B to limit the angular movement of the rotor. In FIG. 2 two such dowel pins which extend into the chambers A and B from the head 14 are shown at 124 and 125. For purposes of clarity, however, the dowel pins 124 and 125 are not shown in the other figures of the drawing.

Figure 7:
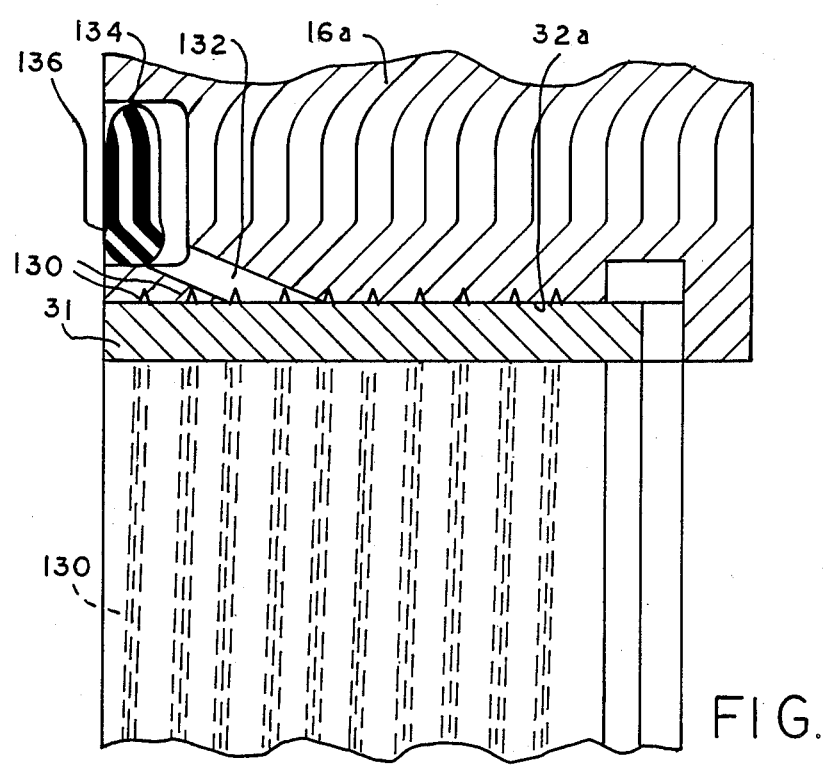
FIG. 7 is a cross-sectional view showing an alternative shaft bearing construction.

Referring to FIG. 7 there is shown an alternative sleeve bearing design for equalizing the pressure at the distal end of the shaft 28. As there shown the bore 32a in the head member 16a is provided with a shallow, helical groove 130 which is "V" shaped in cross-section. In this embodiment of the invention a pressure equalizing passage 132 extends from the wall of the bore 32a to the bottom of an annular groove 134 which receives a floating seal 136 in the form of an annular gasket which is axially moveable in the groove 136. Fluid may thus move back and forth between the rear end of the shaft 28 and the working chamber in the housing 12.

Figure 8:
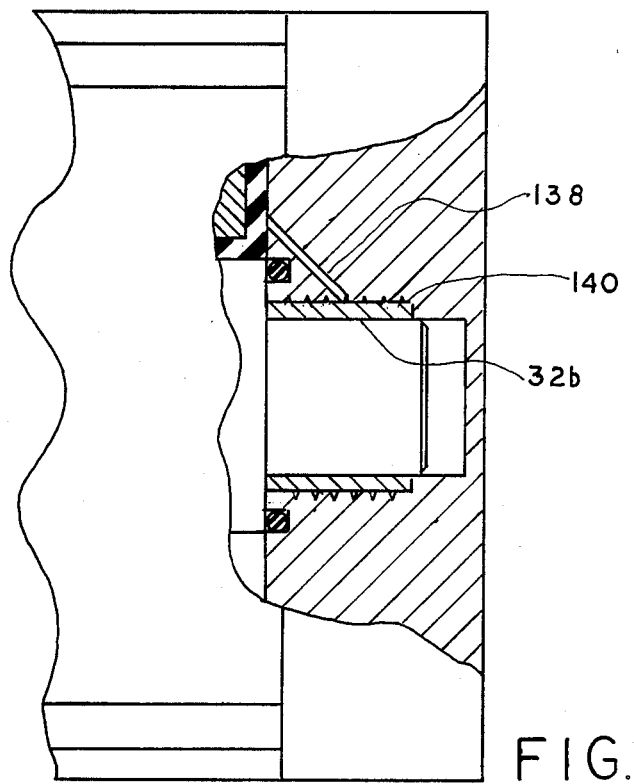
FIG. 8 is a partially cross-sectioned elevational view of a torque resistance device embodying another feature of the invention.

In the embodiment shown in FIG. 8, the pressure equalizing passageway 138 extends from the inner face of the head member to the wall of the bearing cavity 32b, the latter being provided with a helical groove 140 like the groove 130 in the embodiment of FIG. 7.

While the present invention has been described in connection with a particular embodiment thereof, it will be understood by those in the art that many changes may be made without departing from the true spirit and scope of the present invention. Therefore, it is intended by the appended claims to cover all such changes and modifications which come within the true spirit and scope of this invention.

What is claimed is:

1. Apparatus for applying an adjustable resistance to the rotation of a shaft, said apparatus comprising in combination
    housing means enclosing a generally cylindrical bore,
    said shaft extending through said bore along the central longitudinal axis thereof,
    stator means extending radially between said shaft and the wall of said bore,
    a vane affixed to said shaft and sealed to said wall of said bore to provide a first chamber between one side of said vane and one side of said stator and to provide a second chamber between the other side of said vane and the other side of said stator,
    hydraulic fluid filling said first and second chambers,
    first and second passageways opening respectively into said first and second chambers,
    adjustable valve means connecting said first passageway to said second passageway,
    said adjustable valve means positioning an adjustable restrictive orifice through which fluid must pass in order to flow between said first and second chambers,
    said housing includes a tubular body member enclosing said cylindrical bore and first and second head members respectively mounted to said body member over opposite ends of said bore,
    said first and second passageways extending through said first head member and opening onto one surface of of said first head member in mutual proximity,
    a recess in said one surface of said first head member into which said first and second passageways open,
    said adjustable valve means including a valve body member mounted to said first head member over said recess and a valve element,
    said valve body member having a hole extending therethrough in alignment with the opening of said first passageway into said recess, and
    said valve element being axially movable in said hole toward and away from said opening to provide an adjustable restriction to the flow of said hydraulic fluid between said first and second passageways.

2. Apparatus according claim 1, wherein
    said valve body is provided with a second hole opening into said recess, and
    reservoir means mounted in said second hole for providing a supply of hydraulic fluid for replacing any hydraulic fluid which leaks from said first and second chambers.

3. Apparatus according to claim 2, wherein said reservoir means comprises
    a cylindrical reservoir chamber open at one end and closed at the other end,
    a piston reciprocably mounted in said reservoir chamber,
    first spring means urging said piston toward said closed end,
    a third passageway connected between said closed end and said recess in said first head,
    an annular valve seat in said third passageway facing away from said reservoir chamber,
    a valve member movable away from and into sealing engagement with said valve seat, and
    second spring means urging said valve member against said seat to seal said reservoir chamber from said recess.

4. Apparatus according to claim 2 wherein said reservoir means comprises:
    a cylindrical reservoir chamber open at one end and closed at the other end,
    a piston reciprocably mounted in said reservoir chamber,
    spring means urging said piston toward said closed end,
    a third passageway connected between said closed end and said recess in said first head,
    an annular valve seat in said third passageway facing away from said reservoir chamber, a valve member movable away from and into sealing engagement with said valve seat, another spring means urging said valve member against said seat, and a pressure equalizing groove means in said valve seat for providing a passageway which bypasses said valve member when said valve member is seated against said seat.

5. Apparatus for applying an adjustable resistance to the rotation of a shaft, said apparatus comprising in combination, a first body member having a cylindrical bore extending therethrough for containing a hydraulic fluid, first and second head members secured to said first body member over the ends thereof, a cylindrical bore closed at one end and centrally disposed in one of said head members, a bearing sleeve mounted in said bore, said shaft being journaled in said bearing sleeve and extending through said bore along the central longitudinal axis thereof, stator means sealably affixed to said body and head members and extending radially into said bore into sealing relationship with said shaft, vane means sealably affixed to said shaft and sealed to said head members and to the wall of said bore to provide a first chamber between one side of said vane means and said stator means and a second chamber between the other side of said vane means and said stator means, and passageway means extending between the wall of said bore and at least one of said chambers, a second body member mounted to said first head member and defining with said first head member a cavity, first and second passageways in said first head member opening at one end onto said cavity and respectively opening at the other ends onto said first and second chambers, and a valve means threadedly received in said second body member for adjustably closing the opening of said first passageway into said cavity whereby to adjustably restrict the flow of said hydraulic fluid between said first and second passageways as said shaft and vane means are rotated.

6. Apparatus according to claim 5 comprising a groove in the wall of said bore providing a passageway extending from said passageway means to said one end of said bore.

7. Apparatus according to claim 6, comprising an annular groove in one face of said one of said first and second chambers, said one face forming one wall of said first and second chambers, an annular sealing gasket disposed in said annular groove, and said passageway means opening into said annular groove.

8. Apparatus according to claim 6, wherein said groove is helical and surrounds said bearing sleeve.

* * * * *

UNITED STATES PATENT AND TRADEMARK OFFICE
CERTIFICATE OF CORRECTION

PATENT NO. : 4,941,554
DATED : Jul. 17, 1990
INVENTOR(S) : Phillip A. Sollami

It is certified that error appears in the above-identified patent and that said Letters Patent is hereby corrected as shown below:

Column 6, line 8 "positioning" should be -providing-.

Signed and Sealed this

Fourth Day of February, 1992

Attest:

HARRY F. MANBECK, JR.

*Attesting Officer*     *Commissioner of Patents and Trademarks*